United States Patent
Jang et al.

(10) Patent No.: US 10,718,239 B2
(45) Date of Patent: Jul. 21, 2020

(54) VALVE TIMING ADJUSTMENT APPARATUS FOR INTERNAL COMBUSTION ENGINE

(71) Applicants: Hyundai Motor Company, Seoul (KR); KIA Motors Corporation, Seoul (KR); Delphi Powertrain Systems Korea Ltd., Changwon-si, Gyeongsangnam-do (KR); Pine Engineering Ltd., Changwon-si, Gyeongsangnam-do (KR)

(72) Inventors: Koun Young Jang, Changwon-si (KR); Sung Dae Kim, Changwon-si (KR); Sang Ho Lee, Changwon-si (KR); Jae Young Kang, Changwon-si (KR); Sung Hoon Baek, Gimhae-si (KR); Soo Deok Ahn, Changwon-si (KR)

(73) Assignees: HYUNDAI MOTOR COMPANY, Seoul (KR); KIA MOTORS CORPORATION, Seoul (KR); DELPHI POWERTRAIN SYSTEMS KOREA LTD., Changwon-si, Gyeongsangnam-Do (KR); PINE ENGINEERING LTD., Changwon-si, Gyeongsangnam-Do (KR)

( * ) Notice: Subject to any disclaimer, the term of this patent is extended or adjusted under 35 U.S.C. 154(b) by 884 days.

(21) Appl. No.: 15/382,925

(22) Filed: Dec. 19, 2016

(65) Prior Publication Data

US 2017/0183985 A1    Jun. 29, 2017

(30) Foreign Application Priority Data

Dec. 23, 2015    (KR) .................. 10-2015-0185229

(51) Int. Cl.
*F01L 1/344*    (2006.01)
*F01L 1/047*    (2006.01)
*F02D 13/02*    (2006.01)

(52) U.S. Cl.
CPC ............. *F01L 1/3442* (2013.01); *F01L 1/047* (2013.01); *F02D 13/0219* (2013.01);
(Continued)

(58) Field of Classification Search
CPC . F01L 1/34; F01L 1/344; F01L 1/3442; F01L 2001/3443; F01L 2001/34459;
(Continued)

(56) References Cited

U.S. PATENT DOCUMENTS 5,924,395 A * 7/1999 Moriya ................... B60K 6/46
                                                    123/90.15
6,276,322 B1    8/2001 Sekiya et al.
(Continued)

FOREIGN PATENT DOCUMENTS

JP    H09-324613 A    12/1997
JP    H11-062521 A     3/1999
(Continued)

OTHER PUBLICATIONS

Notice of Allowance dated Sep. 17, 2018 from the corresponding U.S. Appl. No. 15/423,237, 19 pages.
(Continued)

*Primary Examiner* — Mark A Laurenzi
*Assistant Examiner* — Loren C Edwards
(74) *Attorney, Agent, or Firm* — Brinks Gilson & Lione

(57) ABSTRACT

The present disclosure provides a valve timing adjustment apparatus for an internal combustion engine. The apparatus includes an anti-rotation mechanism for inhibiting a position change between a rotor and a housing by inhibiting or preventing relative rotation of the rotor to the housing. The anti-rotation mechanism includes: a plurality of locking grooves formed on the ratchet plate with different depths and connected to each other; and a locking pin member having an outer pin elastically disposed in a fitting hole formed in
(Continued)

one of the vanes, and an inner pin elastically disposed inside the outer pin. In particular, the inner pin locks the rotor to the housing when the outer pin and the inner pin are sequentially fitted in the locking grooves by torque from the camshaft.

10 Claims, 8 Drawing Sheets

(52) U.S. Cl.
CPC .............. *F01L 2001/3443* (2013.01); *F01L 2001/34459* (2013.01); *F01L 2001/34463* (2013.01); *F01L 2001/34469* (2013.01); *F01L 2001/34479* (2013.01); *F01L 2250/02* (2013.01); *F01L 2250/04* (2013.01); *F01L 2820/02* (2013.01); *Y02T 10/18* (2013.01)

(58) Field of Classification Search
CPC ... F01L 2001/34463; F01L 2001/34479; F01L 1/047; F01L 2250/02; F01L 2250/04; F01L 2820/02; F02D 13/0219; Y02T 10/18
USPC ........................................... 123/90.15, 90.16
See application file for complete search history.

(56) References Cited

U.S. PATENT DOCUMENTS

| | | |
|---|---|---|
| 2002/0152978 A1 | 10/2002 | Todo |
| 2012/0000437 A1 | 1/2012 | Ozawa et al. |
| 2012/0055429 A1* | 3/2012 | Nakamura ............ F01L 1/3442 123/90.17 |
| 2013/0104820 A1 | 5/2013 | Watanabe |
| 2013/0180481 A1 | 7/2013 | Kato et al. |
| 2016/0024978 A1 | 1/2016 | Lichti |
| 2016/0230614 A1 | 8/2016 | Scheidig et al. |
| 2017/0022854 A1 | 1/2017 | Takada |
| 2017/0130617 A1 | 5/2017 | Haltiner, Jr. et al. |

FOREIGN PATENT DOCUMENTS

| | | |
|---|---|---|
| JP | 2000-002104 A | 1/2000 |
| JP | 2000-179310 A | 6/2000 |
| JP | 2001-050016 A | 2/2001 |
| JP | 2002-357105 A | 12/2002 |
| JP | 2010-285986 A | 12/2010 |
| JP | 2012-057487 A | 3/2012 |
| JP | 2013-155612 A | 8/2013 |
| KR | 10-2010-0132923 A | 12/2010 |
| KR | 10-2012-0032510 A | 4/2012 |

OTHER PUBLICATIONS

Non-Final Office Action dated Jul. 12, 2018 from the corresponding U.S. Appl. No. 15/449,290, 9 pages.
Korean Office Action dated Jun. 20, 2017 form the corresponding Korean Application No. 10-2016-0001689, 6 pp.
Chinese Office Action dated Dec. 24, 2019 from the corresponding Chinese Application No. 201611194857.7, 7 pp.

\* cited by examiner

VALVE TIMING ADJUSTMENT APPARATUS FOR INTERNAL COMBUSTION ENGINE

CROSS REFERENCE TO RELATED APPLICATION

The present application claims priority to and the benefit of Korean Patent Application No. 10-2015-0185229, filed Dec. 23, 2015, the entire contents of which is incorporated herein by reference in its entirety.

FIELD

The present disclosure relates to a valve timing adjustment apparatus for an internal combustion engine.

BACKGROUND

The statements in this section merely provide background information related to the present disclosure and may not constitute prior art.

In general, an internal combustion engine (hereafter, referred to as an "engine") is equipped with a valve timing adjustment apparatus that can change timing of intake valves and exhaust valves, depending on the operation state of the engine. Such a valve timing adjustment apparatus adjusts the timing of intake valves or exhaust valves by changing a phase angle according to the displacement or rotation of a camshaft connected to a crankshaft usually through a timing belt or a chain, and various types of valve timing adjustment apparatuses have been proposed.

In general, a vane type valve timing adjustment apparatus that includes a rotor having a plurality of vanes freely rotated by working fluid in a housing is generally used.

The vane type valve timing adjustment apparatus adjusts valve timing using a difference in rotational phase generated due to relative rotation in an advance direction or a retard direction of a rotor that is rotated through vanes operated by the pressure of working fluid to an advance chamber or a retard chamber between a full advance phase angle and a full retard phase angle.

We have discovered that a positive torque is generated by friction due to rotation of a cam in opposite direction to the rotational direction of the cam. Meanwhile, a negative torque is generated by restoring force of a valve spring in the same direction as the rotational direction of the cam when a valve starts closing, and the negative force is smaller than the positive torque.

SUMMARY

The present disclosure provides a valve timing adjustment apparatus for an internal combustion engine, whereby the apparatus can improve the performance of an engine and contribute to reducing the size of an engine by enlarging the variable adjustment range of a phase angle of a rotor through several steps of locking that uses negative torque.

In one form, the present disclosure provides a valve timing adjustment apparatus for an internal combustion engine. The apparatus is coupled to a camshaft operating with a crankshaft to adjust valve timing of at least one of an intake valve and an exhaust valve using torque from the camshaft and the pressure of working fluid. The valve timing adjustment apparatus includes: a housing defining a space with a ratchet plate operatively associated with the crankshaft; a rotor having a plurality of vanes configured to rotate relative to the housing within a predetermined angle range by the pressure of the working fluid, the rotor disposed in the housing to operate with the camshaft; and an anti-rotation mechanism inhibiting or preventing a positional change between the rotor and the housing by inhibiting or preventing relative rotation of the rotor to the housing.

In particular, the anti-rotation mechanism includes: a plurality of locking grooves formed on the ratchet plate with different depths and connected to each other; and a locking pin member which has: an hollow outer pin elastically disposed in a fitting hole formed in at least one vane of the plurality of vanes, and an inner pin elastically disposed inside the outer pin. The inner pin is configured to lock the rotor to the housing the outer pin and the inner pin are sequentially fitted in the plurality of locking grooves.

The plurality of locking grooves may include a large groove having a large diameter and a small groove having a small diameter so as to form a stepped portion having predetermined depths.

The width of the stepped portion may be double a thickness of the outer pin, and an inner diameter of the small groove may be the same as an outer diameter of the outer pin.

The locking pin member may further have an upper cap having a first recession therein and is configured to close a first end of the fitting hole.

A second recession may be formed at a first end of the outer pin, and an outer spring applying elasticity to the locking groove may be disposed between the second recession and a first end of the upper cap.

A third recession may be formed at a first end of the inner pin, and an inner spring applying elasticity to the plurality of locking grooves may be disposed between the third recession and a first recession of the upper cap.

The rotor in the housing may have four vanes.

A sealing groove may be formed in a longitudinal direction of the camshaft at ends of the plurality of vanes that face an inner side of the housing, and a seal is disposed in the sealing groove.

The locking pin member may further have a lower cap being positioned at a second end of the fitting hole, and the lower cap is configured to support an outer side of the outer pin.

An exhaust hole is additionally formed in the rotor and configured to discharge the working fluid in the plurality of locking grooves when the locking pin member is locked.

In one aspect of the present disclosure, there is provided a valve timing adjustment apparatus for an internal combustion engine. The apparatus is coupled to a camshaft operating with a crankshaft to adjust valve timing of at least one of an intake valve and an exhaust valve using torque from the camshaft and pressure of working fluid. The apparatus may include: a housing defining a space with a ratchet plate operatively associated with the crankshaft; a rotor having a plurality of vanes that is rotated relative to the housing within a predetermined angle range by the pressure of the working fluid, and disposed in a housing to operate with the camshaft; and an anti-rotation mechanism inhibiting or preventing a positional change between the rotor and the housing by inhibiting or preventing relative rotation of the rotor to the housing. In particular, the anti-rotation mechanism includes: a plurality of locking grooves formed in at least one vane of the plurality of vanes of the rotor, the plurality of locking grooves having different depths and connected to each other; and locking pin member having a hollow outer pin elastically disposed in a fitting hole formed in at least one of the ratchet plate, and an inner pin elastically disposed inside the outer pin and configured to lock the rotor to the housing when the outer pin and the inner pin are sequentially fitted in the plurality of locking grooves.

In one aspect of the present disclosure, there is provided a valve timing adjustment apparatus for an internal combustion engine, the apparatus including: a body having a plurality of oil ports on an outer side thereof and configured to operate with a camshaft; a solenoid valve including a spool, which has a plurality of oil grooves 6a around an outer side and is elastically supported by a spring, and disposed in the body to control flow of working fluid by selectively communicating with the oil ports of the body in response to a control signal; a controller configured to transmit the control signal to the solenoid valve, and further including the anti-rotation mechanism for inhibiting or preventing a position change between a rotor and a housing by inhibiting or preventing relative rotation of the rotor to the housing in response to the control signal from the controller.

In one form, the locking pin member having the outer pin and the inner pin is sequentially inserted into the locking grooves by the torque from a camshaft, so that the adjustment range of a phase angle can be enlarged. Therefore, it is possible to reduce the size of the valve timing adjustment apparatus, and improve the performance of an engine by improving fuel efficiency and output of the engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
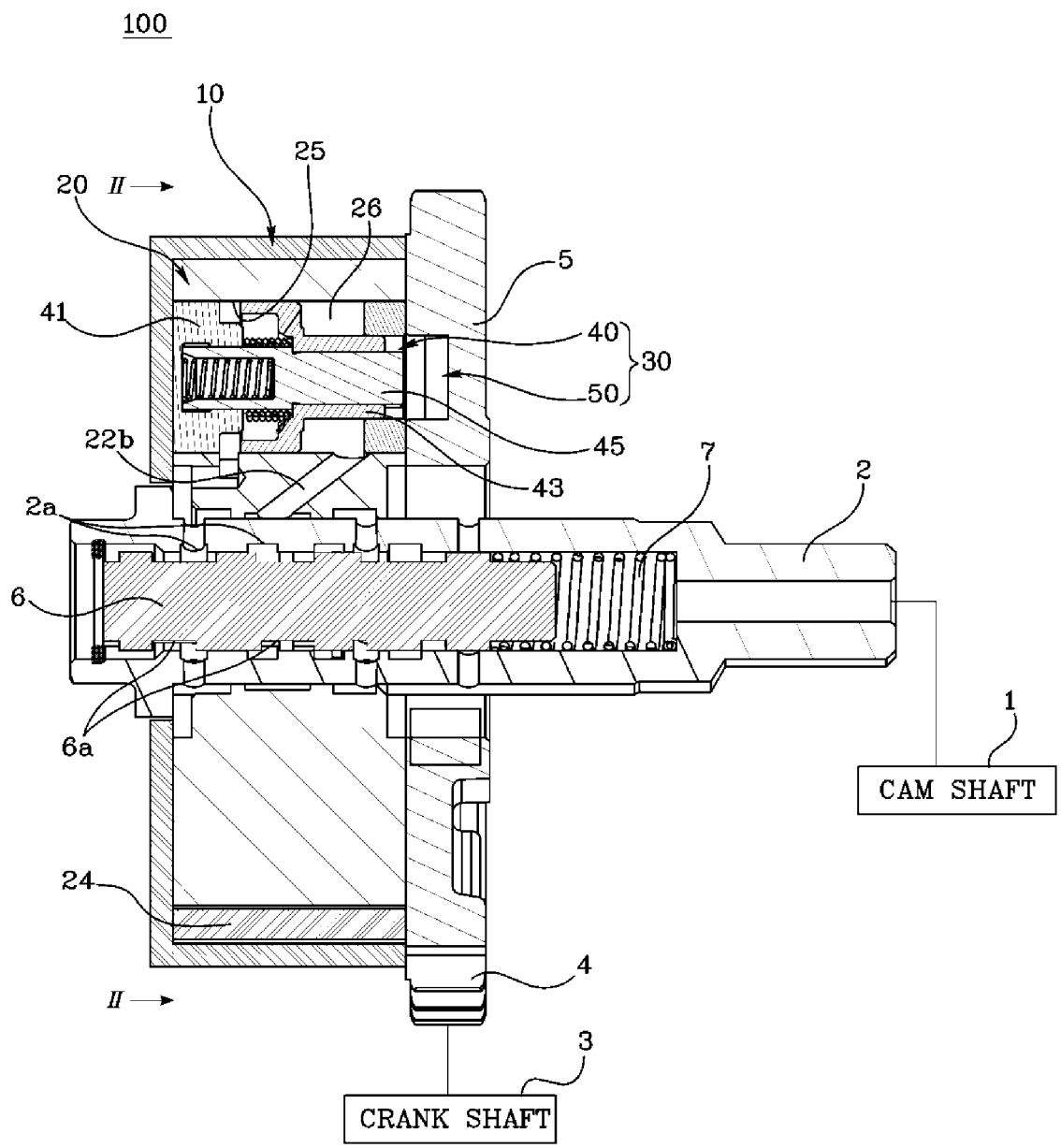
FIG. 1 is a cross-sectional assembly view of a valve timing adjustment apparatus.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A valve timing adjustment apparatus for an internal combustion engine in one form of the present disclosure is described hereafter in detail with reference to the accompanying drawings.

FIG. 1 is a cross-sectional assembly view of a valve timing adjustment apparatus 100 in one form of the present disclosure.

Figure 2:
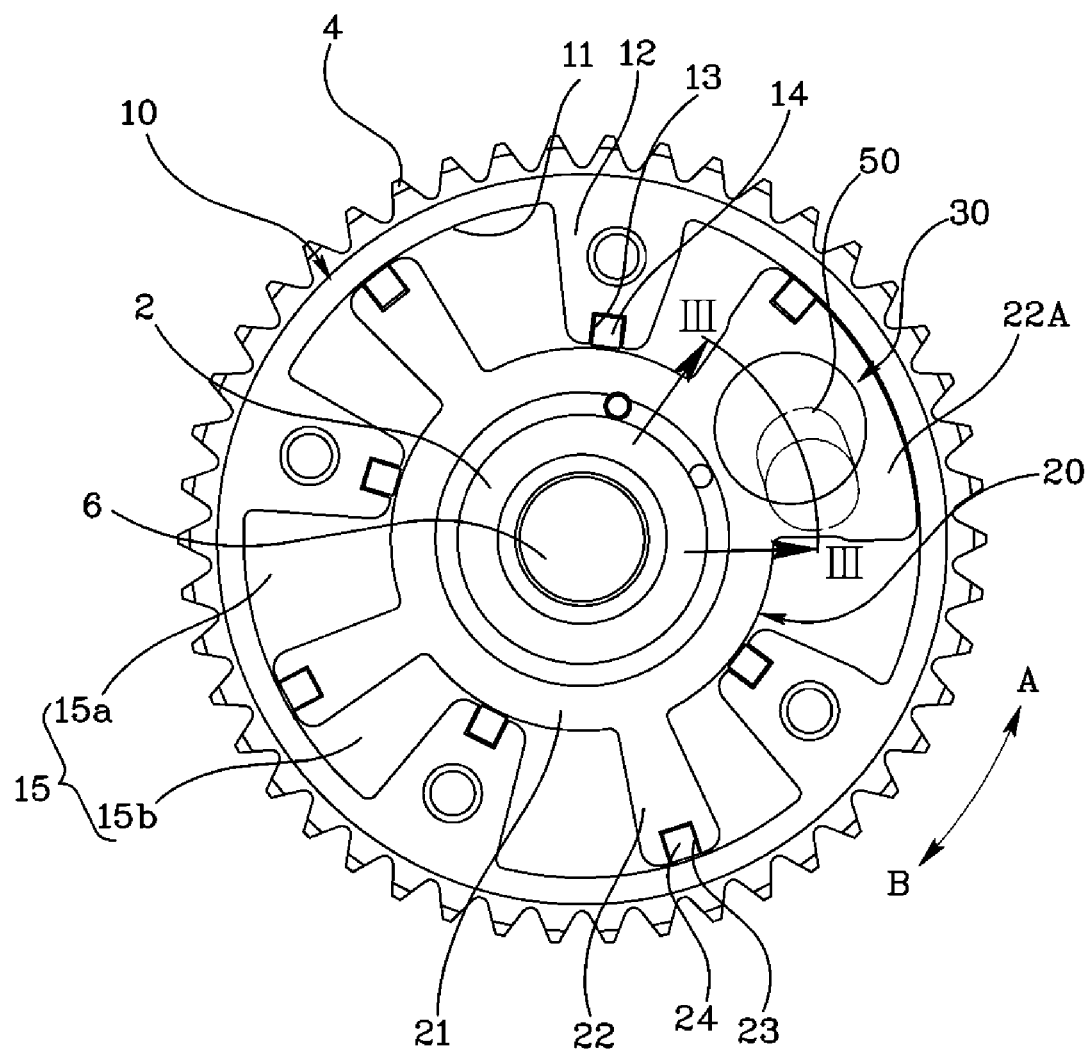
FIG. 2 is a front view taken along line II-II of FIG. 1.
Figure 3:
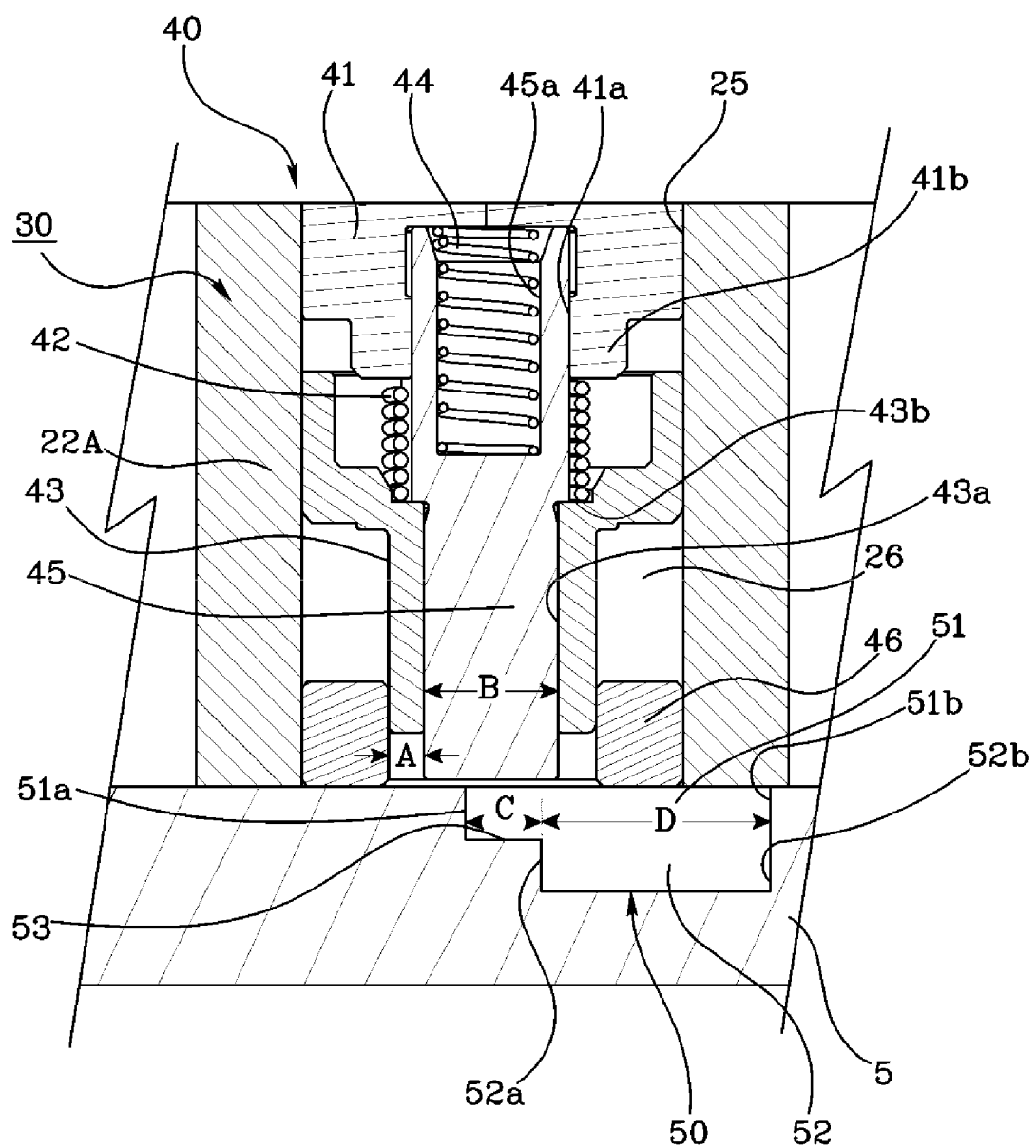
FIG. 3 is a sectional view taken along line III-III of FIG. 2.

Referring to FIGS. 1 to 3, the valve timing adjustment apparatus 100 has a body 2 that is coupled to a camshaft 1 in an internal combustion engine, in which a sprocket 4 that is coupled to a crankshaft 3 through a chain or a timing belt (not shown) is rotatably disposed on the body 2, and a disc-shaped ratchet plate 5 is integrally formed inside of the sprocket 4.

A spool 6 disposed in the body 2 and having a plurality of oil grooves 6a around the outer side and a spring 7 elastically supporting the spool 6 form a solenoid valve. The solenoid valve controls the flow of working fluid by selectively communicating with a plurality of oil ports 2a formed around the body 2 in response to a control signal from a controller (not shown).

Meanwhile, a cylindrical housing 10, a rotor 20 operating with the camshaft 1 and selectively rotating in the housing 10, and an anti-rotation mechanism 30 making the rotor 20 rotate with the housing 10 by inhibiting or preventing relative rotation of the rotor 20 to the housing 10.

A plurality of projections 12 is formed with predetermined intervals around the inner side 11 of the housing 10. A sealing groove 13 is formed at the free end of each of the projections 12 in the longitudinal direction of the housing 10 and a seal 14 is inserted in the sealing grooves 13, thereby forming spaces 15 between adjacent projections 12.

Meanwhile, a plurality of vanes 22 is formed on a boss 21 coupled to the body 2 and protrudes toward the inner side 11 of the housing 10. A sealing groove 23 is formed at the free end of each of the vanes 22 in the longitudinal direction of the rotor 20 and a seal 24 is inserted in the sealing grooves 23, thereby forming spaces 15 between adjacent projections 12 of the housing 10.

The spaces 15 are, as shown in FIG. 2, divided into advance chambers 15a and retard chambers 15b. The advance chambers 15a are in the direction of an arrow B (that is, an advance direction) that is the rotational direction of the camshaft 1, and the retard chambers 15b are in the direction of an arrow A (that is, a retard direction) with the vanes 12 therebetween.

Accordingly, working fluid is selectively supplied into the advance chambers 15a and the retard chambers 15b, and the rotor 20 is rotated in the direction of the arrow B (advance direction) with respect to the housing by torque acting in the vanes 12, thereby adjusting the advance phase. The rotor 20 may be rotated in the direction of the arrow A (retard direction), thereby adjusting the retard phase. With this arrangement, the valve timing of an intake valve or an exhaust valve is adjusted.

The anti-rotation mechanism 30 is provided for emergency operation to selectively inhibit or prevent relative rotation between the rotor 20 and the housing 10 and thus to rotate them together due to external factors. Meanwhile, the anti-rotation mechanism 30 may allow the rotor 20 to freely rotate relative to the housing 10.

In particular, the anti-rotation mechanism 30 may be disposed on one of the vanes 22, as shown in FIG. 2. For the convenience of description, the vane 22 having the anti-rotation mechanism 30 is indicated by reference numeral 22A to be distinguished from other vanes 22.

The anti-rotation mechanism 30, as shown in FIG. 1 or 3, includes a locking pin member 40 inserted in a fitting hole 25 formed through the vane 22A, and a plurality of locking grooves 50 formed in the ratchet plate 5 to be locked to or unlocked from the locking pin member 40.

The locking pin member 40, as shown in FIG. 3, has an upper cap 41 closing a first end (the upper end in FIG. 3) of the fitting hole 25 of the vane 22A, a hollow cylinder-shaped outer pin 43 elastically disposed under the upper cap 41 by an outer spring 42, and an inner pin 45 slidably disposed in the inside 43a of the outer pin 43 and elastically seated in a first recession 41a of the upper cap 41 by an inner spring 44.

The locking pin member 40 may further have a ring-shaped lower cap 46 positioned at a second end (the lower end in FIG. 3) of the fitting hole 25 and supporting the outer side of the outer pin 43.

The outer spring 42 has a first end supported on a step-shaped second recession 43b at the upper portion of the outer pin 43, and a second end supported on a projection 41b extending from the first recession 41a of the upper cap 41.

Further, the inner spring 44 has a first end supported on the bottom of a third recession 45a formed in the upper portion of the inner pin 45, and a second end supported on the bottom of the first recession 41a of the upper cap 41.

The locking grooves 50 formed on the ratchet plate 5 in the anti-rotation mechanism 30, as shown in detail in FIG. 3, are connected and have different diameters and depths, facing the fitting hole 25 of the vane 22A.

That is, the locking grooves 50 are a large groove 51 having a large diameter and a small groove 52 having a small diameter, in which the large and small grooves are connected to form a stepped portion 53 having a stepped cross-section. As shown in FIG. 3, the large groove 51 is formed with a predetermined depth and has left and right inner sides 51a and 51b, and the small groove 52 is formed with a predetermined depth and has left and right inner sides 52a and 52b, in which the right inner side 51b of the large groove 51 may be connected to the right inner side 52b of the small groove 52 in the same plane.

In one form of the present disclosure, as shown in FIG. 3, when the thickness of the outer pin 43 is "A", the inner diameter of the inner pin 45 is "B", the width of the stepped portion 53 is "C", and the inner diameter of the small groove 52 is "D", the relationships between A, B, C and D can be represented by: C=2A, D=B+C. That is, the inner diameter of the small groove 52 may be the same as the outer diameter of the outer pin 43.

An oil channel 22b for supplying working fluid into the space 26 formed around the outer pin 43 or discharging working fluid from the space 26 through the fitting hole 25 is formed at an angle in the vane 22A and communicates with the solenoid valve.

The operation of the valve timing adjustment apparatus in one form of the present disclosure is described hereafter.

The valve timing adjustment apparatus of the present disclosure may be an intermediate phase type of valve timing adjustment apparatus in which the vane 22A is locked almost at the intermediate position between a full retard phase angle position and a full advance phase angle position in the space 15.

When an engine is normally operated, as shown in FIG. 2, the vane 22A of the rotor 20 makes a retard chamber 15b and an advance chamber 15a at the left and right sides in the space 15 between adjacent projections 12 and is freely controlled in the advance direction (direction B) or the retard direction (direction A) with respect to the housing 10 by torque from the camshaft 1, whereby the valve timing of an intake valve or an exhaust valve can be adjusted through the camshaft 1.

When the valve timing adjustment apparatus is operated under specific control and a start ability of an engine is correspondingly improved, or when an uncontrollable emergency occurs while an engine is operated, the locking member 40 needs to be naturally locked under specific control, thereby inhibiting or preventing relative rotation of the rotor 20 to the housing 10.

First, the locking operation of the locking member 40 is described with reference to FIG. 4A to 4F. In one form, the locking operation may be performed when the vane 22A is in a retard position in the space 15, i.e., a biased position toward the retard chamber 15b of the space 15.

Figure 4A:
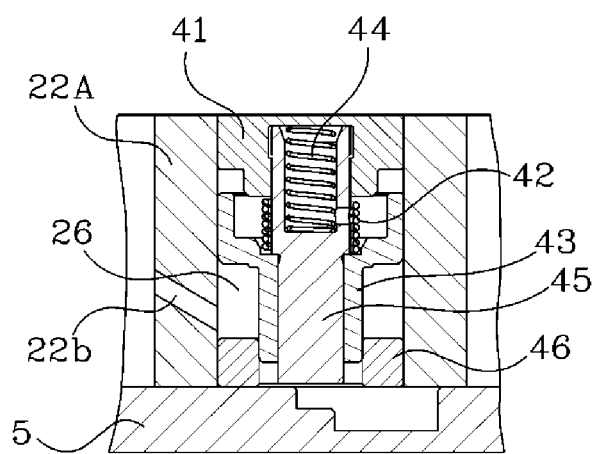
FIGS. 4A to 4F are cross-sectional views sequentially showing that a locking pin member on a vane is fitted into a locking groove by negative torque at a full retard phase angle position.

FIG. 4A shows a state when working fluid has been supplied in the space 26 through the oil channel 22b formed in the vane 22A. In this state, the outer pin 43 and the inner pin 45 have compressed the springs 42 and 44 and have been maximally lifted to the upper cap 41 due to the pressure of the working fluid. Further, the lower end of the inner pin 45 is lifted from the surface of the ratchet plate 5 by the outer pin 43.

Figure 4B:
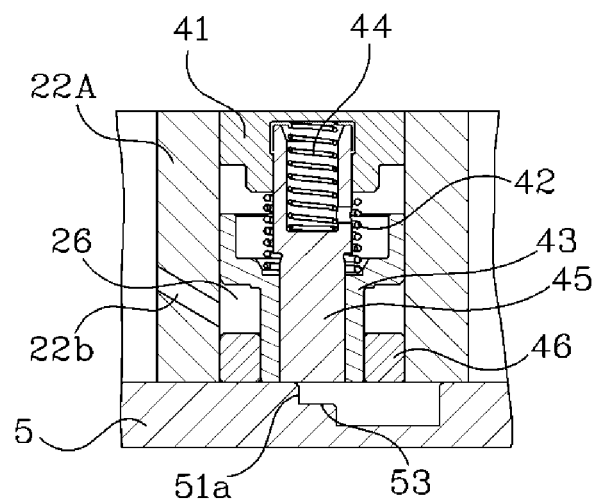

In FIG. 4B, the working oil has been discharged through the oil channel 22b from the state shown in FIG. 4A. In this state, since the pressure of the working fluid has been removed, the outer pin 43 and the inner pin 45 have been moved down by the elasticity of the springs 42 and 44. Further, the lower ends of the outer pin 43 and the inner pin 45 are in close contact with the surface of the ratchet plate 5.

Figure 4C:
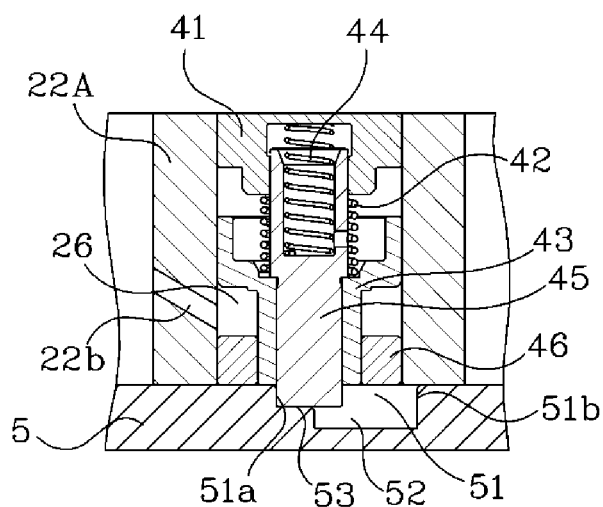

In the state shown in FIG. 4B, negative torque from the camshaft 1 is transmitted to the vane 22A through the rotor 20, and the vane 22 is rotated at a predetermined angle in the advance direction (the direction B), thereby making the state shown in FIG. 4C. That is, the inner pin 45 is moved down and inserted into the large groove 51 by the elasticity of the inner spring 44, and the lower end of the inner pin 45 is locked on the left inner side 51a of the large groove 51 so that the lower end is in close contact with the stepped portion 53. Further, the lower end of the outer pint 43 is still in close contact with the surface of the ratchet plate 5. Accordingly, ratchet operation that inhibits or prevents the vane 22A from moving in the retard direction is performed.

For reference, a bias spring (not shown) may be connected to one side of the rotor 20 in the direction of the camshaft 1, and the bias spring may assist the negative torque through the camshaft 1.

Figure 4D:
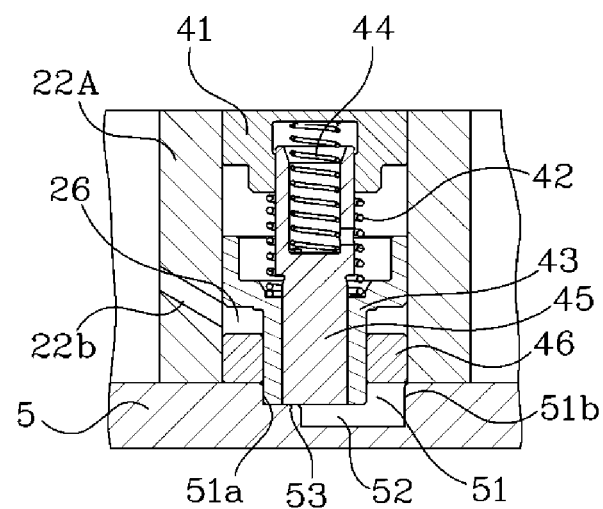

Next, when negative torque is additionally applied from the camshaft 1 to the vane 22A through the rotor 20, the state shown in FIG. 4D is performed. More specifically, the outer pin 43 is moved down and inserted into the large hole 51 by the elasticity of the outer spring 42 from the state shown in FIG. 4C. The lower end of the outer pin 43 is locked on the left inner side 51a of the large hole 51 and both of the lower ends of the outer pin 43 and the inner pin 45 are in close contact with the stepped portion 53. In this state, the vane 22A still cannot move in the retard direction, so the ratchet operation is maintained.

Figure 4E:
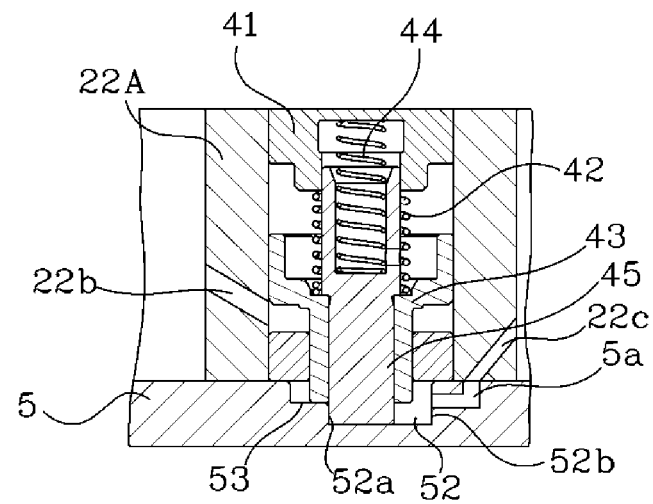

In FIG. 4E, negative torque has been additionally applied to the vane 22A from the state shown in FIG. 4D. That is, the inner pin 45 is moved down and inserted into the small groove 52 by the elasticity of the inner spring 44, and the lower end of the inner pin 45 is locked on the left inner side 52a of the small groove 52 such that the lower end of the inner pin 45 is in close contact with the bottom of the small groove 52. Further, the lower end of the outer pin 43 is still in close contact with the surface of the ratchet plate 5. Accordingly, ratchet operation that inhibits or prevents the vane 22A from moving in the retard direction is maintained.

Figure 4F:
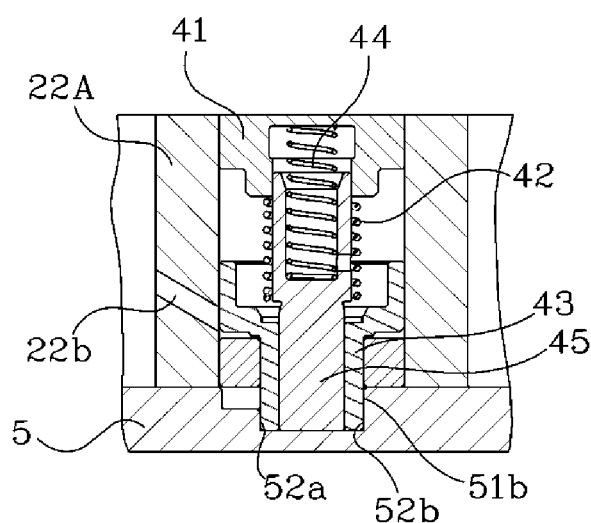

When negative torque is additionally applied to the vane 22A in the state shown in FIG. 4E, the lower ends of the outer pin 43 and the inner pin 45 are all brought in close contact with the bottom of the small groove 52 by the elasticity of the outer spring 42 and the inner spring 44, as shown in FIG. 4F. In this state, the lower end of the outer pin 43 is locked on the right inner side 51b of the large groove 51 and on the left and right inner sides 52a and 52b of the small groove 52, and the vane 22A is locked without moving in both of the retard direction and the advance direction. Accordingly, the locking pin member 40 is firmly fitted in the locking groove 50 of the ratchet plate 5, so that the rotor 20 rotates together with the housing 10, without rotating relative to the housing 10.

As described above, the locking pin member 40 is sequentially locked in the locking groove 50 of the ratchet plate 5 by relatively small negative torque when the vane 22A is at a retard position. In one form of the present disclosure, since locking is sequentially performed through five steps, the position of starting an engine can be moved in the retard direction, the size of the valve timing adjustment apparatus can be reduced, and the efficiency and performance of the engine can be improved by improving the operation of opening and closing an intake valve or an exhaust valve.

Next, locking operation by using positive torque from the camshaft is described with reference to FIG. 5A to 5C. In particular, the vane 22A is biased to an advance position, that is, in the advance chamber 15a of the space 15.

Figure 5A:
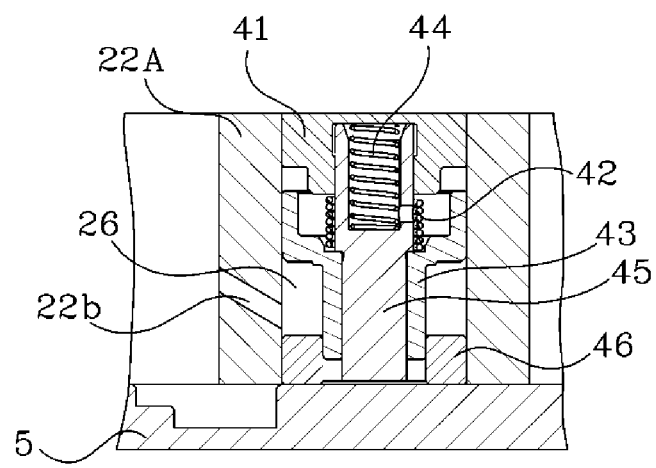
FIGS. 5A to 5C are cross-sectional views sequentially showing that a locking pin member on a vane is fitted into a locking groove by positive torque at a full advance phase angle position.

FIG. 5A shows a state when working fluid has been supplied in the space 26 through the oil channel 22b formed in the vane 22A. The outer pin 43 has been maximally lifted to the upper cap 41, compressing the outer spring 42 due to the pressure of the working fluid. Further, the lower end of the inner pin 45 is lifted from the surface of the ratchet plate 5 by the outer pin 43.

Figure 5B:
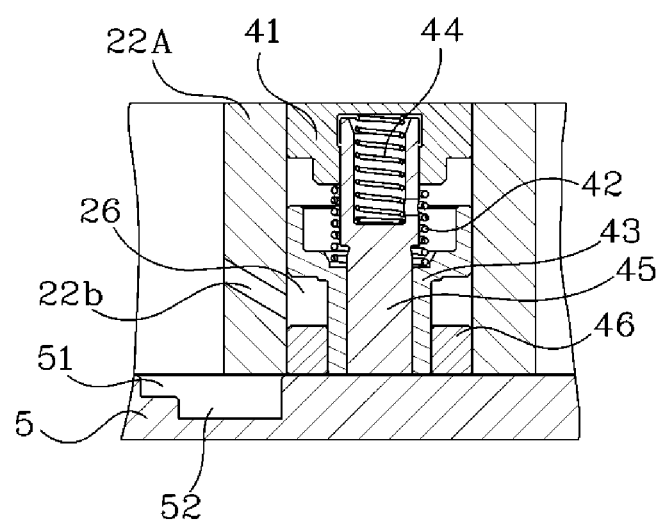

Next, the state shown in FIG. 5B is created by discharging the working fluid through the oil channel 22b from the state shown in FIG. 5A. That is, since the pressure of the working fluid applied to the outer pin 43 is removed, the outer pin 43 is moved down by the elasticity of the outer spring 42. Accordingly, the lower ends of the outer pin 43 and the inner pin 45 are brought in close contact with the surface of the ratchet plate 5 by the elasticity of the springs 42 and 44.

Figure 5C:
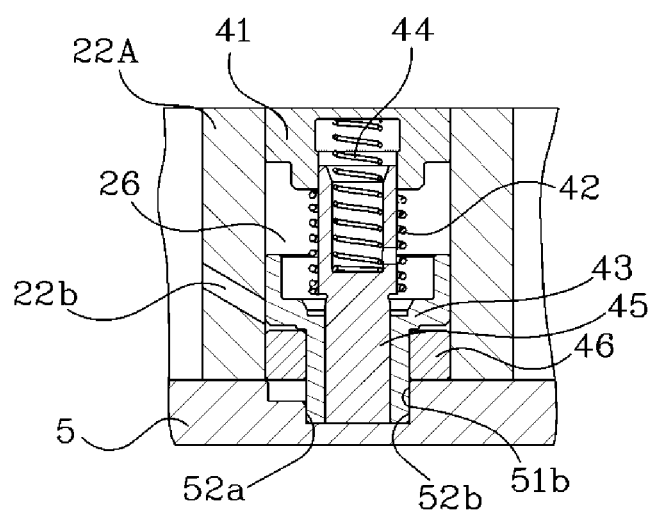

In the state shown in FIG. 5B, negative torque from the camshaft 1 is transmitted to the vane 22A through the rotor 20, and the vane 22 is rotated at a predetermined angle in the retard direction (the direction A), thereby making the state shown in FIG. 5C. In general, positive torque is larger than negative torque, so locking is achieved through one step in one form of the present disclosure.

In particular, the outer pin 43 and the inner pin 45 in the state shown in FIG. 5B are inserted through one step into the small groove 52 through the large groove 51 of the locking grooves 50 by the elasticity of the springs 42 and 44. Accordingly, as illustrated in FIG. 5C, the lower end of the outer pin 43 is locked on the right inner side 51b of the large groove 51, and on the right inner side 52b and the left inner side 52a of the small groove 52.

Therefore, the vane 22A is in a locking state in which it cannot move in both the retard direction and the advance direction. As a result, the locking pin member 40 is locked in the locking groove 50 of the ratchet plate 5, so the rotor 20 rotates together with the housing 10, without rotating relative to the housing 10.

The above description is just an exemplary form of the present disclosure and the present disclosure is not limited thereto. It should be understood by those skilled in the art that the present disclosure may be changed and modified in various ways within the scope of the present disclosure.

For example, although the rotor 20 has four vanes 22 in the form of the present disclosure, three or other numbers of vanes 22 may be provided, depending on the type or the operational characteristics of an engine.

Further, although one vane 22A has the locking pin member 40 in the form of the present disclosure, two vanes 22A of the rotor 20 each may have the locking pin member 40.

Further, exhaust holes 22c and 4a may be formed in the vane 22A and the ratchet 5, respectively, to communicate with the locking groove 50 so that the working fluid in the locking groove 50 can be discharged when the outer pin 43 or the inner pin 45 is moved down into the locking groove 50.

Further, although, in the anti-rotation mechanism 30, the locking pin member 40 is formed on the rotor 20 and the locking groove 50 is formed in the ratchet plate 5 in the form of the present disclosure, a locking groove may be formed in the rotor 20 and the ratchet plate 5 may have the locking pin member 40.

Although exemplary forms of the present disclosure has been described for illustrative purposes, those skilled in the art will appreciate that various modifications, additions and substitutions are possible, without departing from the scope and spirit of the present disclosure.

What is claimed is:

1. A valve timing adjustment apparatus for an internal combustion engine, the valve timing adjustment apparatus comprising:
    a housing defining a space with a ratchet plate operatively associated with a crankshaft;
    a rotor having a plurality of vanes configured to rotate relative to the housing within a predetermined angle range by a pressure of a working fluid, the rotor disposed in the housing to operate with a camshaft; and
    an anti-rotation mechanism configured to inhibit or prevent a positional change between the rotor and the housing by inhibiting or preventing relative rotation of the rotor to the housing,
    wherein the anti-rotation mechanism includes:
    a plurality of locking grooves formed on the ratchet plate with different depths; and
    a locking pin member comprising:
        an outer pin elastically disposed in a fitting hole formed in at least one vane of the plurality of vanes, and
        an inner pin disposed inside the outer pin and configured to move relative to the outer pin, and lock the rotor to the housing when the outer pin and the inner pin are independently and sequentially fitted in the plurality of locking grooves.

2. The valve timing adjustment apparatus of claim 1, wherein the plurality of locking grooves includes a large groove having a large diameter and a small groove having a small diameter, wherein the large groove and the small groove form a stepped portion having predetermined depths.

3. The valve timing adjustment apparatus of claim 2, wherein a width of the stepped portion is double a thickness of the outer pin, and an inner diameter of the small groove is the same as an outer diameter of the outer pin.

4. The valve timing adjustment apparatus of claim 1, wherein the locking pin member further has an upper cap having a first recession therein and is configured to close a first end of the fitting hole.

5. The valve timing adjustment apparatus of claim 4, wherein a second recession is formed at a first end of the outer pin, and an outer spring applying elasticity to the plurality of locking grooves is disposed between the second recession and a first end of the upper cap.

6. The valve timing adjustment apparatus of claim 5, wherein a third recession is formed at a first end of the inner pin, and an inner spring applying elasticity to the plurality of locking grooves is disposed between the third recession and the first recession of the upper cap.

7. The valve timing adjustment apparatus of claim 6, wherein the locking pin member further has a lower cap being positioned at a second end of the fitting hole, and the lower cap is configured to support an outer side of the outer pin.

8. The valve timing adjustment apparatus of claim 7, wherein an exhaust hole is additionally formed in the rotor and configured to discharge the working fluid in the plurality of locking grooves when the locking pin member is locked.

9. The valve timing adjustment apparatus of claim 1, wherein the plurality of vanes includes four vanes.

10. The valve timing adjustment apparatus of claim 9, wherein a sealing groove is formed in a longitudinal direction of the camshaft at ends of the plurality of vanes that face an inner side of the housing, and a seal is disposed in the sealing groove.

\* \* \* \* \*